UNITED STATES PATENT OFFICE 2,522,306

DELAYED SWELLING LOCUST BEAN GUM LAXATIVE

Joseph A. Serrallach, Barcelona, Spain

No Drawing. Application July 14, 1950,
Serial No. 173,940

2 Claims. (Cl. 167—56)

The present invention comprises a novel bulk laxative having a delayed swelling characteristic that renders it particularly effective and beneficial for the human organism. In one aspect it consists in a powdered preparation of locust bean gum.

There are at the present time available on the domestic market about twenty bulk laxatives and these may be divided into two groups; those that dissolve quickly in water, of which psyllium gum is an example, and those that swell quickly on being immersed in liquid, of which karaya gum is an example. Both of these types of laxative are unsatisfactory and objectionable when used alone in that the quick dissolving or swelling results in the formation of a viscous mass that upsets all the digestive tract conditions of viscosity and diffusion of digestive juices with resulting discomfit to the patient.

The present invention is based on my discovery that a preparation can be made from the locust bean having a delayed swelling characteristic such that it will pass through the stomach, duodenum and small intestines of the patient without substantial change and therefore without interfering in any way with the digestive processes, being completely indigestible and completely non-toxic. It is only after the preparation has reached the colon that it begins to swell and thereupon to form a jelly-like soft mucilaginous mass. The mission of the laxative at this stage is to absorb and retain water from the contents of the colon and to lubricate and protect the colon walls.

The locust bean has a kernel with a nutritive germ and an endosperm consisting of a gum which may be isolated in the form of a fine powder and is known as locust bean gum, or carob gum. These kernels are found in the long, flat, edible pods, known as St. John's bread, of the carob tree, a native of the Mediterranean region, known also as algaroba. For its preparation the endosperm of these kernels are subjected to a severe grinding procedure. A very fine powder results which has been used for sizing textiles, increasing the loafing properties of wheat flour, smoothing out ice cream, etc. If it is used in this powdered form as a bulk laxative, it swells rapidly when saturated with moisture. However, I have found that if the powder is first mixed with sufficient water to form a plastic mass, then converted to granular form and the granules dried, the product acquires a delayed swelling characteristic although the mucilaginous condition into which it is converted while contained in the colon has substantially the same viscosity as that presented by the saturated untreated powder. My experiments have shown that the granules are so slowly pervious to moisture that this delayed swelling occurs only about six hours after the granules have been introduced into the body, this being ample time for them to pass practically unchanged into the colon.

The procedure of mixing the powdered gum with water, granulating the resulting mass and drying it in this particular case of locust bean gum is essential in giving it the delayed swelling characteristic that other laxatives lack and which is so highly desirable.

The amount of water required to produce the desired smooth homogeneous plastic mass of putty-like consistency varies from 40% to 200% of the weight of the dry powder depending upon the procedure followed. For example, I may take 200 lbs. of the locust bean gum ground to the fineness of flour and mix it by hand with 400 lbs. of water to produce a plastic mass of the desired consistency. This mass is then extruded by forcing it through a wire mesh having openings perhaps $\frac{1}{32}''$ square, and in this operation the plastic mass is converted into well defined threads or strings of plastic material. These threads are then dried naturally or artificially to a moisture content of 5% to 10%. When dried they become brittle and may be broken up into granules of any desired size. In some cases it may be desired to compress the granules into the form of pellets.

Alternatively I may take 100 lbs. of locust gum powder and add to it 40 lbs. of water in the form of a fine spray, meanwhile stirring and mixing the mixture in a power driven machine. When the mixture is converted to the desired putty-like consistency it may be forced through a grinder, extruded in strings, cut into granular form, and dried at room temperature.

In general it is desirable to carry out the mixing step by power means since by this procedure the amount of water required may be reduced with a corresponding reduction in the length and expense of drying time. It is desirable to carry out the drying operation as quickly as possible but at temperatures which will not damage the gum, that is to say, not over 100° C.

The powder of the locust bean gum may be mixed with small amounts of other laxative or antispastic ingredients in the form of fine dry powders or extracts for the purpose of regulating or modifying the action of the granular product such, for example, as phenol-phthalein or belladonna, or other gums in powdered form like karaya or psyllium, to modify the swelling.

If desired the dry granules may be coated to give them color, taste, or attractive appearance; for example, by subjecting the granules to a mist of chlorophyll solution an attractive greenish tint may be imparted to them, or peppermint oil for flavor.

The product above described is attractive in appearance and flavor, and due to its delayed swelling characteristic it gives the patient no discomfort or sensation of weight in the stomach. As already stated, it interferes in no way with digestion. It is moreover free of the serious objection to refined mineral oils as a laxative since these have been found to dissolve the fat soluble vitamins out of the intestinal tract and leave the patient in a vitamin deficient condition. The dosages of my novel product are not critical but would be substantially the same as other bulk laxatives.

This application is filed as a continuation in part for my application Ser. No. 689,828, filed August 10, 1946, now abandoned.

Having thus disclosed my invention and described in detail a preferred manner of producing it, I claim as new and desire to secure by Letters Patent:

1. A bulk laxative comprising granules of locust bean gum in the form of powder which has been mixed with water in an amount substantially 200% of its own weight and then dried to a moisture content of approximately 5 to 10%, with the result that the granules are so slowly pervious to moisture that they have a delayed swelling action in the human digestive system.

2. A bulk laxative comprising dried, hard, compact granules of locust bean gum which have been formed from locust bean gum powder, the powder having been mixed with a sufficient amount of water to form a smooth, plastic, homogeneous mass of putty-like consistency, the mass thereafter having been extruded, dried and formed into granules, said granules having the characteristics of having a delayed swelling action in as much as six hours when administered orally in the human body.

JOSEPH A. SERRALLACH.

No references cited.